United States Patent
Mayeaux

(10) Patent No.: US 8,616,228 B1
(45) Date of Patent: Dec. 31, 2013

(54) MULTI-STAGE RATIO PRESSURE REGULATOR SYSTEM

(75) Inventors: Donald P Mayeaux, St Amant, LA (US); Emma Lee Aymond Mayeaux, legal representative, St Amant, LA (US)

(73) Assignee: A+ Manufacturing, LLC, Gonzales, LA (US)

( * ) Notice: Subject to any disclaimer, the term of this patent is extended or adjusted under 35 U.S.C. 154(b) by 35 days.

(21) Appl. No.: 13/479,800

(22) Filed: May 24, 2012

Related U.S. Application Data

(63) Continuation-in-part of application No. 12/131,987, filed on Jun. 3, 2008, now Pat. No. 8,220,479.

(51) Int. Cl.
*F17D 1/00* (2006.01)

(52) U.S. Cl.
USPC ............... 137/12; 137/505.12; 137/505.25; 137/613; 137/906

(58) Field of Classification Search
USPC ............ 137/505.12, 505.14, 505.15, 505.25, 137/505.13, 505.28, 12, 14, 115.13, 484.2, 137/494, 906
See application file for complete search history.

(56) References Cited

U.S. PATENT DOCUMENTS

| | | | |
|---|---|---|---|
| 3,545,485 A | 12/1970 | Clark | 137/508 |
| 4,566,488 A | 1/1986 | Chow et al. | 137/613 |
| 4,802,507 A | 2/1989 | Willson | 137/613 |
| 5,520,206 A | 5/1996 | Deville | 137/12 |
| 6,152,158 A | 11/2000 | Hu | 137/14 |
| 6,701,794 B2 * | 3/2004 | Mayeaux | 73/863.23 |
| 6,904,816 B2 * | 6/2005 | Mayeaux | 73/863.23 |
| 6,959,724 B2 | 11/2005 | Heiderman | 137/494 |
| 7,004,041 B2 * | 2/2006 | Mayeaux | 73/863.23 |
| 7,048,000 B2 | 5/2006 | Koelzer | 137/505.25 |
| 7,314,059 B2 | 1/2008 | Schuetze et al. | 137/487.5 |
| 7,565,911 B2 | 7/2009 | Bonta, Jr. | 137/14 |
| 8,220,479 B1 * | 7/2012 | Mayeaux | 137/12 |

* cited by examiner

*Primary Examiner* — John K Fristoe, Jr.
*Assistant Examiner* — Minh Le
(74) *Attorney, Agent, or Firm* — Joseph T Regard Ltd plc

(57) ABSTRACT

A multi-stage pressure regulator system. The system of the present invention provides for distribution of the Joules-Thomson (J-T) cooling effect between multiple stages. In the preferred embodiment of the present invention, the pressure is first reduced by a set ratio in one or more stages followed by an adjustable pressure output stage. The present invention thereby provides a system to control pressure reduction and thus prevent condensation (and associated distortion of a vapor composition sample) of a gas due to J-T cooling effect. The system of the present invention is particularly suitable for use placement (via, for example, a probe) within the source gas supply containment vessel, pipeline or the like, so that pressure reduction occurs at or near isothermal conditions, further lessening the likelihood of J-T condensation.

23 Claims, 12 Drawing Sheets

MULTI-STAGE RATIO PRESSURE REGULATOR SYSTEM

PRIORITY CLAIM

The present application is a continuation in part of U.S. Utility patent application Ser. No. 12/131,987, entitled "Multi-Stage Ratio Pressure Regulator System", filing date Jun. 3, 2008, now U.S. Pat. No. 8,220,479 listing Donald P Mayeaux as inventor.

TECHNICAL FIELD OF INVENTION

The present invention relates to a multi-stage pressure regulator in which pressure is first reduced by a set ratio in one or more stages, so as to provide for distribution of the Joules-Thomson (J-T) cooling effect between multiple stages. This is useful in an analytical application, where the J-T cooling effect resulting from a large pressure drop would cool a gas below its dew-point temperature, resulting in condensation of some components, which would distort the vapor composition.

BACKGROUND OF INVENTION

The heating value of natural gas has a significant impact on its monetary value. In general, the heating value of natural gas increases as the concentration of low volatility, high molecular weight components increases. Condensation of gas phase components, which reduce the proportion of high molecular weight components, therefore tends to decrease gas phase heating value, while vaporization of entrained liquid has the opposite effect.

In order for natural gas supply to keep up with demand over the next 10 to 20 years, it will be necessary to increase production from deep-water fields in the Gulf of Mexico. (Refer to Volume 1, Fall/Winter 1997 official newsletter of Colorado Engineering Experiment Station Inc.) Gas produced from said deep-water fields contains higher concentrations of low volatility components, such as water vapor and heavy hydrocarbons, and has a higher susceptibility to condensation than shelf and onshore production gas.

Additionally, some onshore produced gas, particularly in low ambient temperature regions, is susceptible to condensation of low volatility components. Condensation of low volatility components distorts the remaining vapor phase composition thereby changing its physical properties, heating value and monetary value.

The American Petroleum Institute (API) and the Gas Processors Association (GPA) are two leading industry organizations, having recommended standard practices for sampling and analysis of natural gas.

Both organizations require that the temperature of Natural gas samples be maintained above their hydrocarbon dew-point temperature. Most compositional analyzers require the sample gas pressure to be reduced substantially below the supply gas pressure. A gas pressure regulator is typically utilized for this purpose. In many cases, during pressure reduction, the J-T cooling effect cools the gas below its hydrocarbon dew-point temperature resulting in condensation of some low volatile components thereby altering its vapor phase composition and monetary value. This can be seen in the Phase diagram of FIG. 1.

Note that this particular gas composition, at the original source pressure, point "A" (2014.7 PSIA and temperature of 60° F.), all the components are in the gas phase. However after pressure reduction to 24.7 PSIA (point B) the J-T cooling effect has reduced the gas temperature to −27.9° F., which is well below its hydrocarbon dew-point temperature of −6.93° F. at that pressure. The sample gas at point B no longer conforms to the Industry standards and is no longer representative of the original source gas.

There are cases wherein Point B is in the gas phase, however the adiabatic or near adiabatic pressure drop line AB traverses the liquid phase envelope (2-Phase region) as seen in the Phase diagram of FIG. 2. When this occurs, the possibility exists for the transitional liquid formed to become separated from the gas phase, thereby causing compositional differences along a sample gas passageway.

It is possible, in some cases, to preheat the gas sufficiently to prevent it from traversing the 2-Phase region during pressure reduction. However it is not always safe or practical to preheat the gas sample to the required level.

An additional problem which occurs during pressure reduction and regulation of a high pressure gas, is the instability of the secondary pressure or "set pressure". A common trait of single stage pressure regulators is that the secondary pressure is affected by changes in the primary or supply pressure. In many analytical applications, changes in the sample gas pressure feeding an analyzer has a negative impact on its accuracy.

Therefore, it is advantageous to reduce high pressure natural gas sample sources in a manner which prevents condensation of some vapor phase components and provides a secondary pressure essentially independent of source pressure changes.

Further, it can be beneficial to reduce and regulate natural gas sample pressure internal to the pressure source. In such case, a flowing natural gas source, such as in a pipeline, can be utilized to maintain the sample gas at a near isothermal condition during pressure reduction. Refer to Mayeaux U.S. Pat. Nos. 7,004,041; 6,904,816; and 6,701,794.

However, as previously mentioned, there are cases wherein, at the initial and reduced pressure, the gas is totally in the gas phase but has traversed through the 2-Phase region, thereby subjecting it to distortion from condensation.

Insertion-type "probe regulators" such as described in Mayeaux U.S. Pat. Nos. 7,004,041; 6,904,816; and 6,701,794 (the contents of which are incorporated hereto by reference), employ a single stage of regulation. As previously mentioned, there are cases where a single stage of pressure reduction, providing essentially an adiabatic pressure drop, can result in distortion of the sample gas composition by cooling the gas below its hydrocarbon dew-point. Refer to FIG. 1.

Prior art, multi-stage pressure regulators are bulky and typically limited to two stages. Further, the output pressure setting for stages upstream of the final stage in prior art systems are typically preset internally or externally adjustable for specific circumstances. The emphasis in prior art multi-stage regulators is on regulated pressure stability. Little or no consideration is given to minimizing the J-T cooling effect. Therefore, prior art multi-stage pressure regulators designs do not address the major issues involved in the modern day sampling of Natural gas for compositional analysis.

FIG. 4 illustrates a typical two-stage pressure regulator, wherein with the first stage output set at 500 PSIG (which is typical) the J-T cooling effect is not distributed evenly between the two stages. Additionally, the actual J-T cooling effect distribution between the two stages varies significantly, and by reducing the gas pressure from 2014.7 to 514.7 in one stage at essentially adiabatic condition utilizing conventional methods, the gas is cooled sufficiently to penetrate the 2-Phase region, resulting in distortion of the a gas sample composition derived therefrom.

Accordingly, it is believed that the prior art has failed to provide a system to reduce and regulate a hydrocarbon sample gas stream pressure in a manner so as to prevent condensation from occurring during and after its transition from high to low pressure due to J-T cooling.

In addition, it is further believed that the prior art has failed to provide a method to regulate and maintain a constant and stable secondary pressure independent of variations of the primary (upstream supply pressure).

GENERAL SUMMARY OF INVENTION

Unlike prior art, the present invention provides for minimizing or eliminating the negative J-T cooling effect impact on natural gas samples during pressure reduction and regulation. The present invention provides for reducing the pressure in each stage by a given ratio calculated to better control the J-T cooling effect, as opposed to a given pressure setting, as is the case with prior art, which does not take into consideration J-T cooling.

Accordingly, in the present invention, a ratio for each stage is selected to provide a somewhat uniform distribution of J-T effect cooling among each of the pressure reduction stages at a maximum expected input supply pressure, so as to best control same. After each stage of pressure reduction, the gas is reheated, thereby preventing large temperature drops which could cause condensation of some hydrocarbons.

It has been discovered, that by reducing the gas pressure of a typical natural gas composition by a given ratio for each pressure reduction stage, the J-T cooling effect can be distributed more evenly among said pressure reduction stages than proper art methods. An example is shown in FIG. 3. Wherein the pressure is reduced in each of the first three stages by a set ratio and the fourth stage output pressure is set to a specific pressure. It can be seen in FIG. 3 that at no time did the sample gas cross into the 2-Phase region (phase envelope) as had occurred with a single stage pressure drop seen in FIG. 1.

The transition cooling which takes place during pressure reduction at each stage is minimized in the multi-stage pressure reduction system of the present invention, as shown in FIG. 3, as opposed to the excessive J-T cooling shown in FIG. 4 utilizing the conventional two-stage regulator means, which can result in distortion of any sample derived therefrom.

In the present invention, a means for maintaining the input and output pressure of a stage at a given ratio is achieved by applying the input pressure to a first end of a piston disposed in a cylinder and applying the output pressure to the second end of said piston, said second end having a larger cross sectional area than the cross sectional area of said first end.

The ratio between the cross-sectional areas of said first and second piston ends and a reference pressure determines the ratio between the input and output pressure of said stage. Said first and second ends of said piston are fluidly sealed to the internal wall of said cylinder. A region between the two said fluid seals is referenced to a given pressure herein after "reference pressure". Control of the output pressure to maintain the input/output stage ratio is achieved in the following manner. If the output pressure tends to rise above or fall below the set ratio, the piston moves in a manner which changes the input gas flow to the stage, until a balance is achieved.

In a preferred embodiment of the present invention applied to a four stage pressure regulator, the pressure in the first three stages is ratio controlled and the final (fourth) stage is set to control at a specific pressure. In this first preferred embodiment, the pressure control ratio for each of the first three stages is applied to their input pressure measured in "gauge pressure" i.e. as referenced to atmospheric pressure. Therefore, in some cases, after three stages of ratio pressure reduction, it is possible for the output of the third stage to be less then the required output pressure of the fourth adjustable pressure stage.

The minimum supply pressure input to the first stage must be sufficiently high so that after three stages of ratio control the pressure at the outlet of the third ratio stage is greater then the desired pressure setting of the fourth stage outlet.

In a preferred, second embodiment of the present invention, the "reference pressure" is equal to the last stage outlet pressure. In this case, the last stage outlet pressure must be set to a specific value, i.e. it must not be a ratio pressure controlled stage.

By setting the "reference pressure" equal to the last stage outlet set pressure, the first three stages divide the differential between the supply pressure and said last stage outlet pressure, thereby assuring that the output of the last ratio controlled stage (third stage in this case) is always higher then the desired fourth stage output pressure.

In a preferred third embodiment of the present invention, one or more ratio pressure control stages are integrated into the tip of a sample probe pressure regulator. This negates the need for force transfer between an external pressure sensing diaphragm or piston and the pressure control valve internal to the process. This third preferred embodiment makes it possible to utilize multiple stages inside of a probe tip installed in a pressurized pipeline. As previously described, the flowing source gas helps maintain the sample gas, which is undergoing pressure reduction, at a near isothermal condition.

Accordingly, the present invention provides a technique to reduce and regulate a hydrocarbon sample gas stream pressure in a manner which will prevent J-T condensation from occurring during and after its transition from high to reduced or low pressure. The present system also provides a system to regulate and maintain a constant and stable secondary (set) pressure essentially independent of variations in the primary (upstream supply) pressure. Further, as will be shown, both of these features can be accomplished utilizing a system internal to the source gas supply containment vessel or pipeline.

BRIEF DESCRIPTION OF THE FIGURES

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
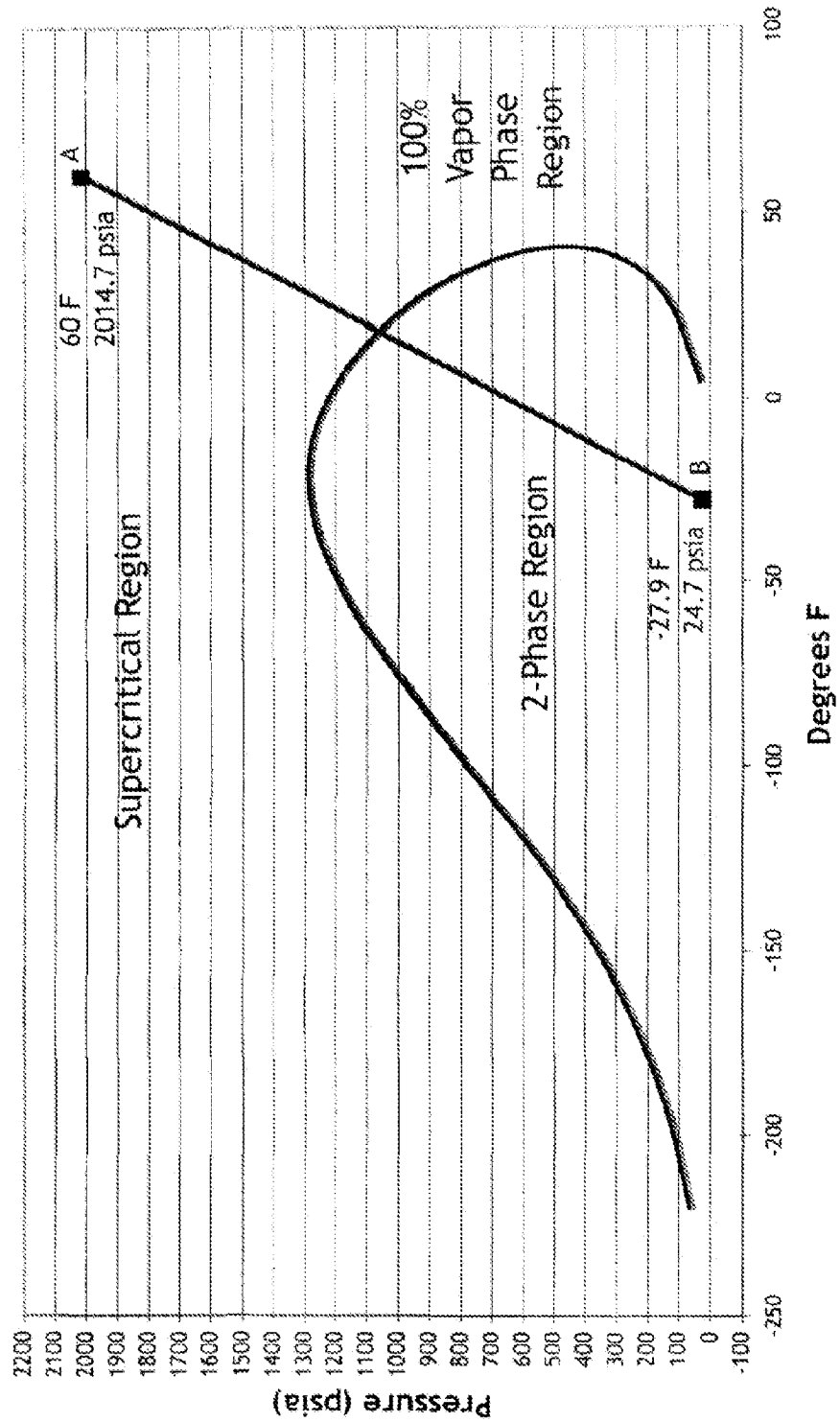
FIG. 1 is a phase change diagram illustrating the J-T cooling a sample gas from point A to below its hydrocarbon dew-point temperature (point B) resulting in condensation.
Figure 2:
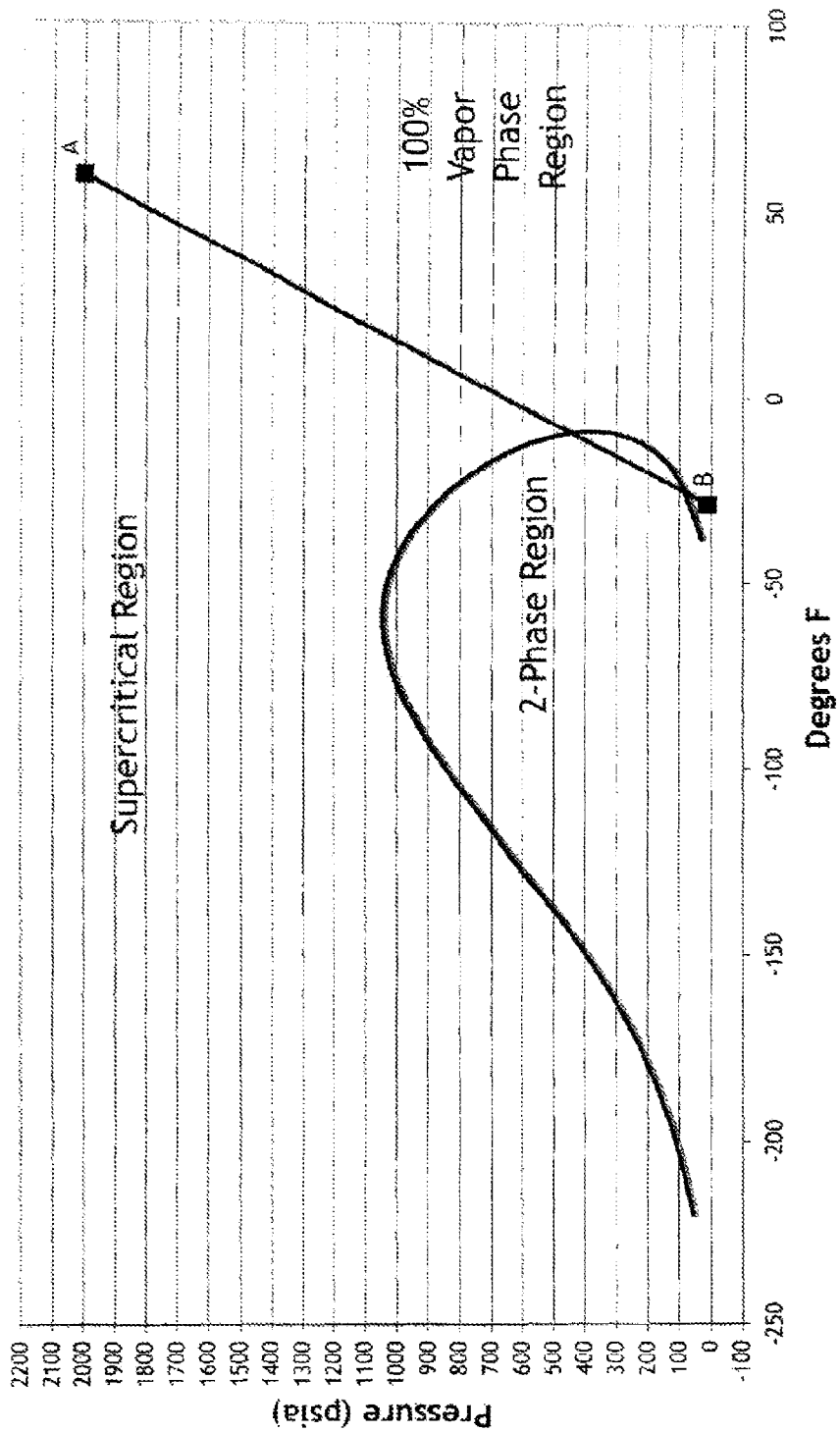
FIG. 2 is a phase change diagram illustrating point B is in the gas phase, however the adiabatic or near adiabatic pressure drop line AB traverses the liquid phase envelope (2-Phase region) resulting in the possibility of transitional liquid separating from the gas phase, which can cause compositional differences along a sample gas passageway.
Figure 3:
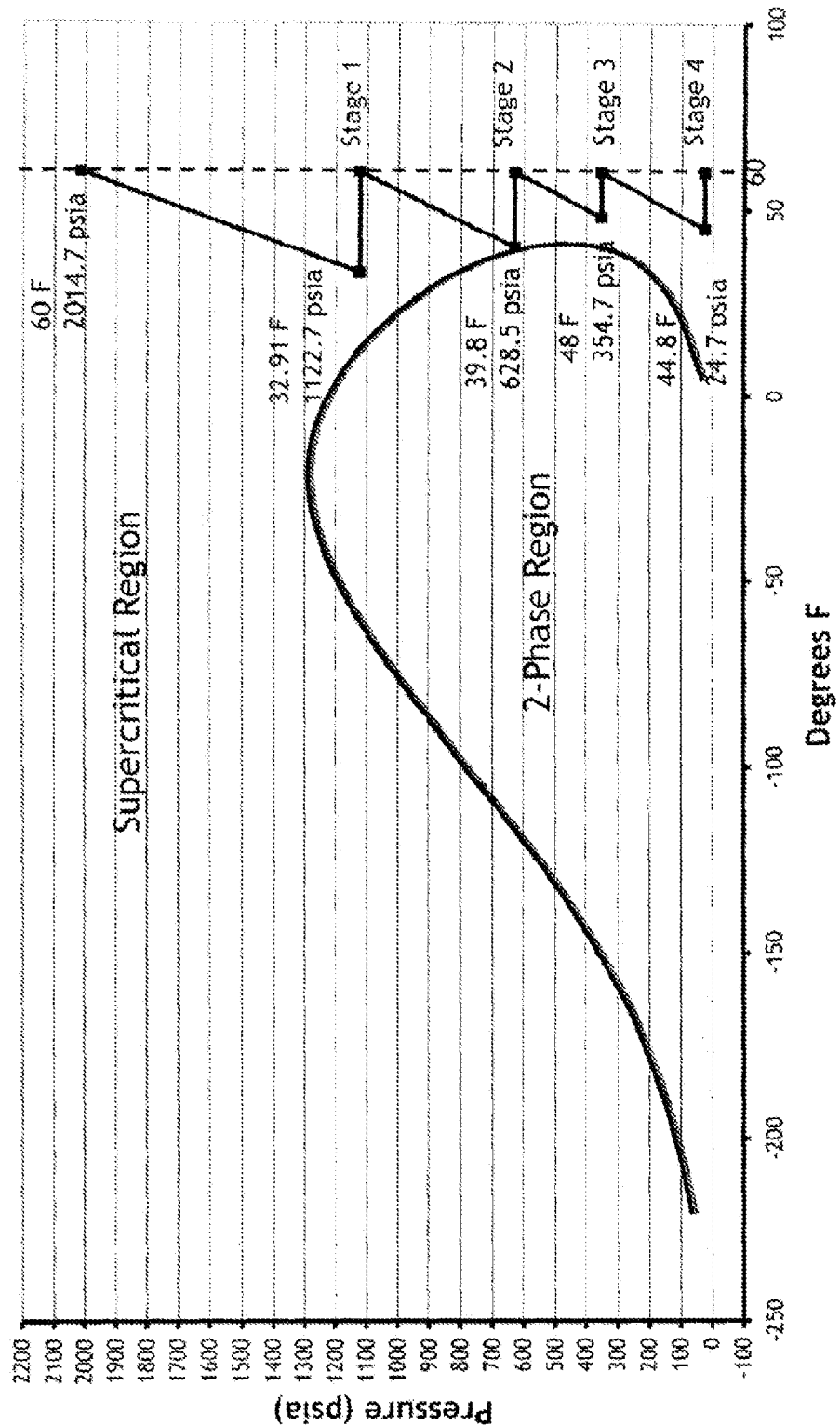
FIG. 3 is a phase change diagram illustrating a method of systematically reducing the pressure of a natural gas composition by a given ratio for each pressure reduction stage so as to distribute the J-T cooling effect so as to prevent condensation.
Figure 4:
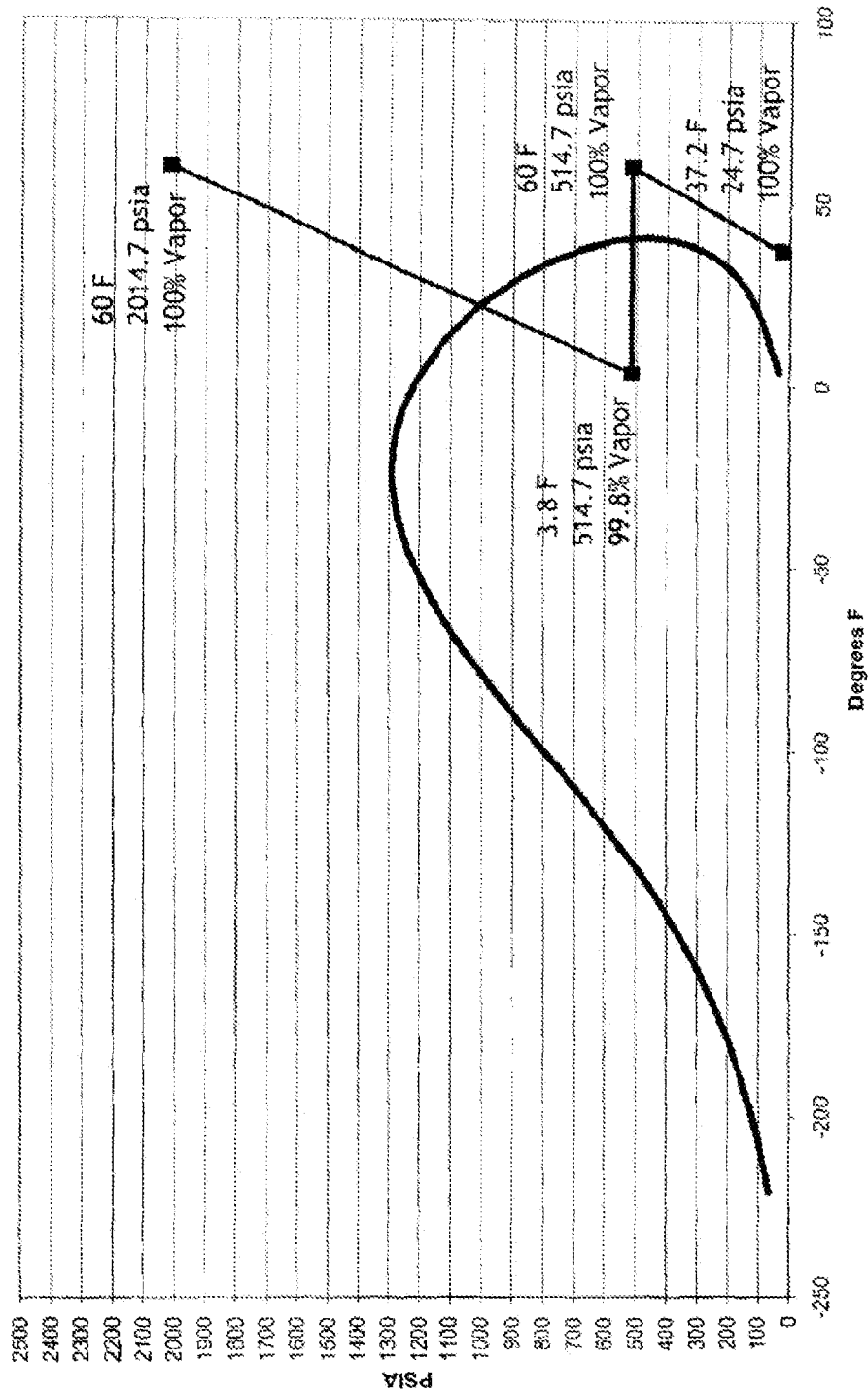
FIG. 4 is phase change diagram illustrating the excessive J-T cooling which can occur utilizing a conventional two-stage regulator to reduce the flow pressure of a gas stream, wherein the pressure/temperature drop line traverses the liquid phase envelope, which can result in distortion from any sample derived therefrom.
Figure 5:
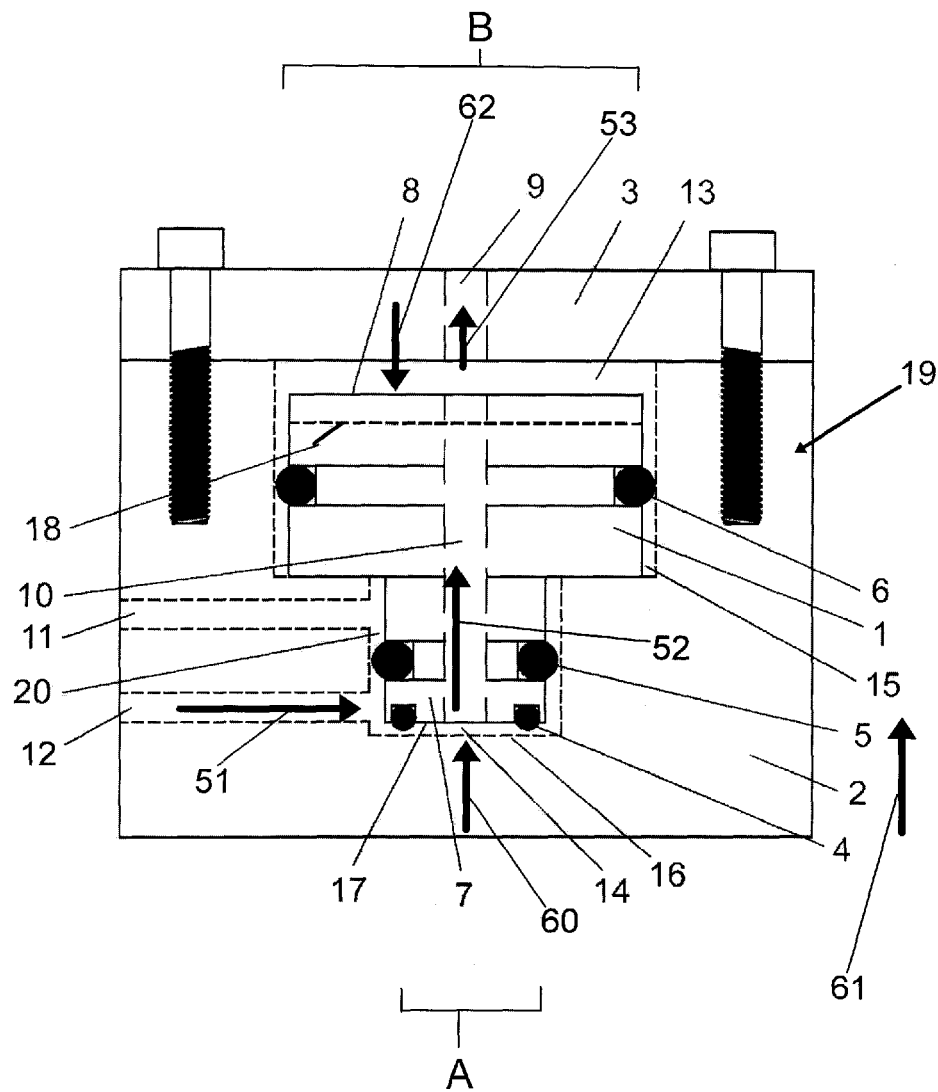
FIG. 5 is a side, cross-sectional view illustrating a first, preferred embodiment of the single stage pressure ratio regulator of the present invention.

Referring to FIG. 5, the first embodiment of the invention contemplates a single stage pressure ratio regulator 19 utilizing a piston 1 having a first end 7 and a second end 18, said piston 1 being disposed within cylinder cavity 15 in body 2. The area A of surface 17 at first piston end 7 is less then the area B of surface 8 of second piston end 18. A source of fluid at a given pressure level "A1" enters 51 inlet passage 12 and flows into lower cylinder cavity 14, through 52 piston passage 10, into upper cylinder cavity 13 and exits 53 through passage 9.

The fluid pressure at level "A1", in lower cylinder cavity 14, acts upon the area A of surface 17 to produce a force 60 against first piston end 7, said force urges piston 1 toward 61 cylinder cap 3. The fluid pressure at level "B1" in upper cylinder cavity 13 from the source fluid acts upon the area of surface 8 to produce a force 62 against second end 18, said force urges piston 1 away from cylinder cap 3. Since the area B of surface 8 is greater than the area A of surface 17, then force 62 is greater than force 60. When fluid pressure level "A1" and "B1" are equal, piston 1 is urged away from cylinder cap 3, thereby reducing the distance between surface 17 of piston end 7 and inner surface 16 of lower cylinder cavity 14.

As said distance is reduced, fluid flow entering piston passage 10 is throttled, which in turn results in a lowering of fluid pressure level "B1". This action causes piston 1 to settle in a position within cylinder cavity 15 wherein the throttling of fluid pressure level "B1" is such that force 62 is equal to force 60. As fluid pressure level "B1" tends to change as a result of changes in the flow rate of fluid exiting upper cylinder cavity 13 through passage 9 force 62 is changed in a manner which urges piston 1 to a position within cylinder cavity 15 wherein throttling of fluid entering piston passage 10 causes force 60 and 62 to become equal.

In a similar manner changes in fluid pressure level "A1" in lower cylinder cavity 14 results in repositioning of piston 1 such that throttling of fluid flow into piston passage 10 causes pressure level "B1" to change thereby changing force 62 in a direction and magnitude which restores the balance, or equality, of between force 60 and 62.

The result is that the pressure level "B1" is regulated in a manner which tends to maintain the ratio of pressure level "B1" to pressure level "A1" equal to the ratio of surface area B to surface area A.

In order for the single stage pressure ratio regulator 19 to operate properly, section 20 of cylinder cavity 15, must be fluidly isolated from lower cylinder cavity 14 and upper cylinder cavity 13. This is accomplished by fluid seals 5 and 6, respectively. The fluid pressure level "C" of section 20 of cylinder cavity 15 is referenced to an external fluid pressure by way of passage 11. When fluid pressure level "C" is referenced to atmospheric pressure then the gauge pressure (the absolute pressure plus 14.7 PSI) of the fluid source entering passage 12 will be reduced by a ratio equal to the ratio of area A of surface 17 to area B of surface 8.

In operation, when it is necessary to shut off fluid flow into passage 10 in order to prevent the pressure in upper cylinder cavity 13 from rising, fluid seal 4 is pressed against inner surface 16 by piston 1 movement away from cylinder cap 3, thereby effectively shutting off fluid flow into passage 10.

Definition of Terms a) Pressure level "A1" ($PL_a$) is the absolute pressure in lower cylinder cavity 14 measured in PSIA
b) Pressure level "B1" ($PL_b$) is the absolute pressure in upper cylinder cavity 13 measured in PSIA
c) $F_a$ is the force resulting from applying fluid pressure to surface area A ($SA_a$)
d) $F_b$ is the force resulting from applying fluid pressure to surface area A ($SA_a$)
e) Surface area "A" ($SA_a$) is the square inches of surface area "A"
f) Surface area "B" ($SA_b$) is the square inches of surface area "B"
g) Reference pressure (RP) is the absolute pressure level "C" in section 20 of cylinder cavity 15 measured in PSIA
h) Pressure control ratio (PCR) is the ratio of surface area "A" to surface area "B" or A:B
   $PL_b$ for a given $PL_a$ and a given PCR is calculated as follows:

$$PL_b = [(PL_a - RP)PCR] + RP$$

Example

Given $PL_a$=114.7 PSIA
RP=14.7 PSIA
$SA_a$=1 square inch
$SA_b$=2 square inches
PCR=1 tO 2 or ½ or 0.5

$$PL_b = [(PL_a - RP)PCR] + RP = [(114.7 - 14.7)0.5] +$$
$$14.7 = [(100)0.5] + 14.7 = 50 + 14.7 = 64.7$$

Force "A" ($F_a$) is the result of applying the differential pressure across fluid seal 5 to $SA_a$. In a similar manner Force "B" ($F_e$) results from applying the differential pressure across fluid seal 6 to $SA_b$.

Said differential pressures calculations require subtraction of the RP from $PL_a$ and $PL_b$. The net result is that the incoming fluid to a single stage pressure ratio regulator, at $PL_a$, is reduced by a specific ratio after first subtracting the RP. This is a very useful characteristic which allows pressure ratio control of a fluid only in a pressure range above the RP. Therefore, $PL_b$ can be made to remain above a given RP providing that $PL_a$ does not dip below said given PR.

For example, if in a given application a minimum of 500 PSIA is required exit of passage 9 ($PL_b$). If an external RP of 500 PSIA is applied to section 20, the $PL_a$ is 2000, and the PCR is 0.5 then $PL_b$ would be 1250 PSIA.

$$i.e. PL_b = [(PL_a - RP)PCR] + RP = [(2000 - 500)0.5] +$$
$$500 = [(1500)0.5] + 500 = 750 + 500 = 1250 \; PSIA$$

In a second example if RP is 500 PSIA, $PL_a$ is 600 PSIA and PCR is 0.5 then $PL_b$ would be 550 PSIA.

$$i.e. PL_b = [(PL_a - RP)PCR] + RP = [(600 - 500)0.5] +$$
$$500 = [(100)0.05] + 500 = 50 + 500 = 550 \; PSIA$$

It can be seen from said example that only the portion of fluid pressure $PL_a$ greater than the RP is reduced by given ratio PCR.

Figure 6:
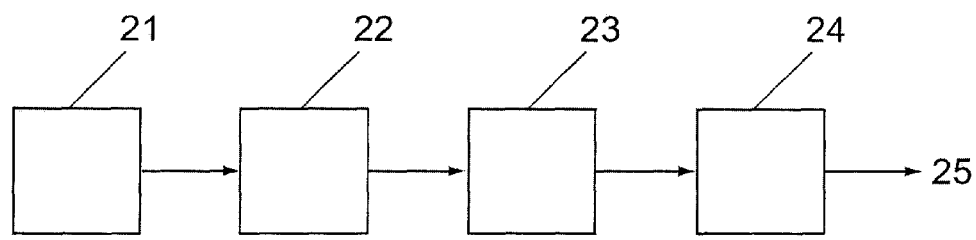
FIG. 6 is a schematic illustrating a second, preferred embodiment of the present invention, wherein there is shown plural stages of pressure ratio control in series so as to provide pressure ratio control.

A second preferred embodiment of the present invention, referring to FIG. 6, comprises multiple series stages of pressure ratio control. Fluid from fluid source 21 flows through first pressure ratio regulator stage 22, a second pressure ratio regulator stage 23, then third pressure ratio regulator stage 24, then exits from cylinder cap passage (9 in FIG. 5) of the third stage 24 to an external destination 25. Each of the pressure regulator stages can be in the form of a single stage pressure ratio regulator, as previously discussed.

Fluid pressure is reduced in each pressure ratio reduction stage in the manner previously described. Each of the said stages is independent in the sense that each one may have a different PCR or RP.

Figure 7:
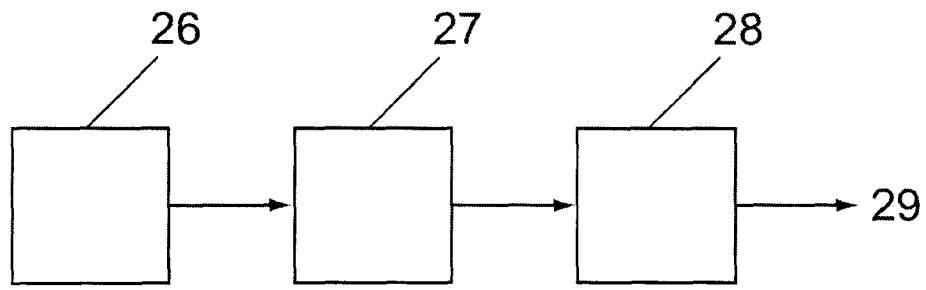
FIG. 7 is a schematic illustrating a third, preferred embodiment of the present invention wherein there is shown one or more stages of pressure ratio control followed by a final conventional adjustable pressure regulator stage.

A third preferred embodiment of the current invention, referring to FIG. 7, comprises one or more stages of pressure ratio control followed by a final conventional adjustable pressure regulator stage such as a diaphragm/load spring type of regulator. In such an arrangement fluid from source 26 flows into first stage pressure ratio regulator 27 then into adjustable pressure regulator stage 28 then flows to an external destination 29. This arrangement provides a simplified first pressure reduction stage 27 which assures that incoming fluid pressure $PL_a$ will be reduced before arriving at the adjustable pressure stage 28. This approach is beneficial for pressure control stability, and spreading the J-T cooling effect to prevent gas composition distortion.

Figure 8:
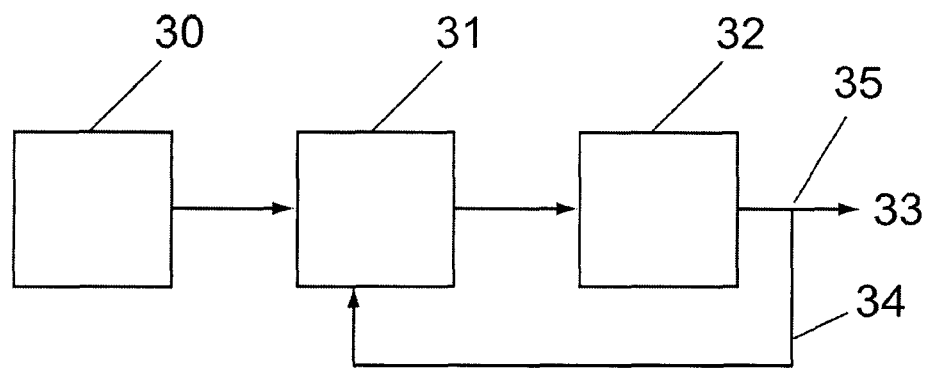
FIG. 8 is a schematic illustrating a fourth embodiment of the present invention, wherein there is shown one or more stages of pressure ratio regulation followed by a final conventional adjustable pressure regulator stage.

A fourth preferred embodiment of the current invention, refer to FIG. 8, consists of one or more stages of pressure ratio regulation followed by a final conventional adjustable pressure regulator stage such as a diaphragm/load spring type of pressure regulator. In such an arrangement fluid from fluid source 30 flows into first stage pressure ratio regulator 31 then into adjustable pressure regulator stage 32 then flows to an external destination 33. The outlet pressure from adjustable pressure 32 is taken at point 35 and supplied by a passage 34 to passage (11 in FIG. 5) of pressure ratio regulator stage 31 which then becomes the RP for said stage 31. This arrangement insures that the pressure of the source fluid will not be reduced below a desired minimum value providing that said desired value is equal to or lower than said pressure of the source fluid ($PL_a$). Said arrangement may also consist of multiple pressure ratio regulator stages.

Figure 9:
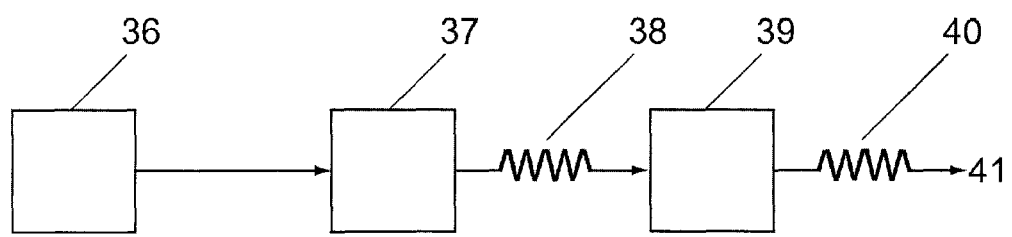
FIG. 9 is a schematic illustrating a fifth embodiment of the present invention, wherein there is shown the selective heating or cooling of the fluid after each pressure ratio regulation and adjustable regulation stage.

A fifth embodiment of the present invention consists of heating or cooling the fluid after each pressure ratio regulation and adjustable regulation stage, referring to FIG. 9. Fluid from fluid source 36 flows through pressure ratio regulator stage 37, through heat exchanger 38, through adjustable pressure regulator stage 39, through heat exchanger 40, then to an external destination 41, not shown. This approach can utilize multiple pressure ratio regulation and adjustable pressure regulation stages, each stage having a heat exchanger downstream of its outlet. The use of said multiple stages minimizes the pressure drop across each stage and therefore also minimizes the Joules-Thomson cooling effect across each stage.

Figure 10:
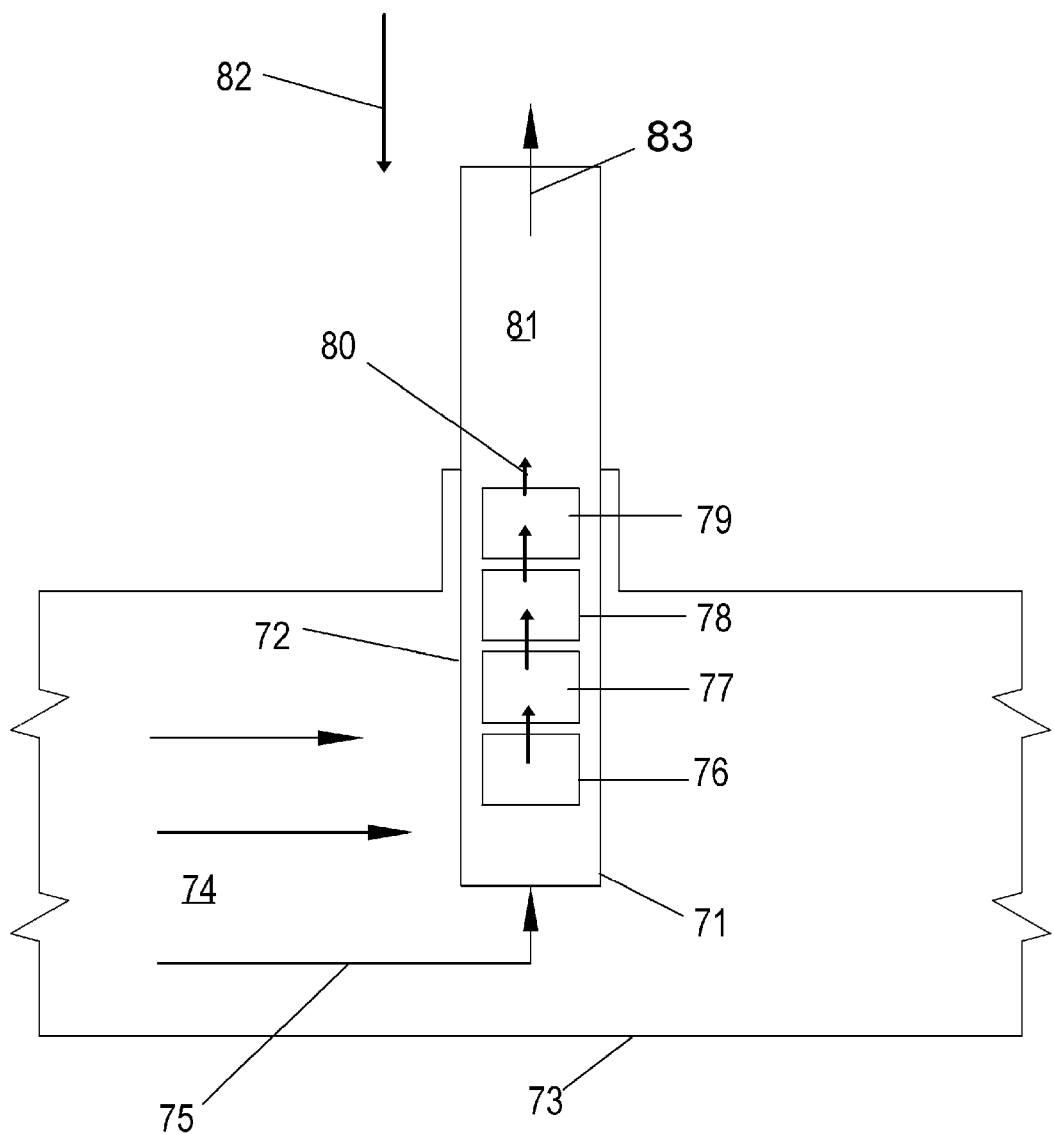
FIG. 10 is a side, cut-away view illustrating a sixth embodiment of the present invention illustrating the incorporation of the plural stages of pressure ratio control (in this example, utilizing the configuration as described in FIG. 6) integrated into the tip of a sample probe, in a gas stream containing vapor phase, low volatile components in a pressurized pipeline.

FIG. 10 is a side, cut-away view of a sixth embodiment of the present invention, illustrating the incorporation of serially arranged, single stage pressure regulators (in this example, utilizing the configuration similar to that as described in FIG. 6, supra, but with an additional (79) pressure regulator stage), all integrated into the a sample probe 72 near its tip 71, which probe tip is situated in a pressurized pipeline 73 containing a process gas stream 74 as well as possible vapor phase, low volatile, or other wise liquid entrained components.

Referring to the figure, one or more serially-arranged, single-stage pressure regulators are integrated withing a sample probe pressure regulator adjacent to its tip 71. By inserting 82 the pressure regulator into a pipeline 73 so as to immerse the probe tip 71 in the flowing source gas, and using said regulators 76-79 in the probe 72 for the distributed, staged pressure reduction of the sample via the serially staged regulators, the likelihood of J-T cooling during the pressure reduction process is reduced or eliminated, as the ongoing pressure reduction is calculated to occur at or near isothermal conditions, that is, at or near the prevailing pressure and temperature of the gas stream in which the probe is immersed. This is because the pressure reduction is staged to allow the gas surrounding the inserted probe tip and regulators functions as a heat sink, minimizing the J-T cooling effect by preventing the gas temperature from significantly lowering during the pressure letdown as it passes through each regulator.

In the present example, the single stage pressure regulators shown may comprise conventional single-stage regulators (such as, for example, adjustable, load-spring type diaphragm regulators), and/or the single stage, pressure ratio-type regulator (regulator 19 described in the discussion of FIG. 5, supra).

In use, fluid 75 from the gas stream 74 flows serially through first pressure ratio regulator stage 76, then to second pressure ratio regulator stage 77, then to third pressure ratio regulator stage 78, then fourth stage 79 for the final pressure adjustment to provide pressure adjusted gas, which exits 80 (if the pressure ratio-type regulator 19 is used, exiting from cylinder cap passage, 9, as described in FIG. 5) into longitudinal probe passage 81 to flow 83 to an external destination outside of pipeline 73.

In the present example, fluid pressure is reduced at each pressure ratio reduction stage sequentially in the manner previously described. Each of the said stages is independent in the sense that each one may have a different PCR or RP.

If it is desired to remove vapor phase, low volatile components from the stream flow 75 prior to regulation, a phase separation membrane may be provided preceding the first regulator for coalescing any vapor phase, low volatile components from the stream flowing into the probe, in a manner described in Mayeaux U.S. Pat. No. 7,004,041, the contents of which are incorporated herein by reference thereto.

Figure 11:
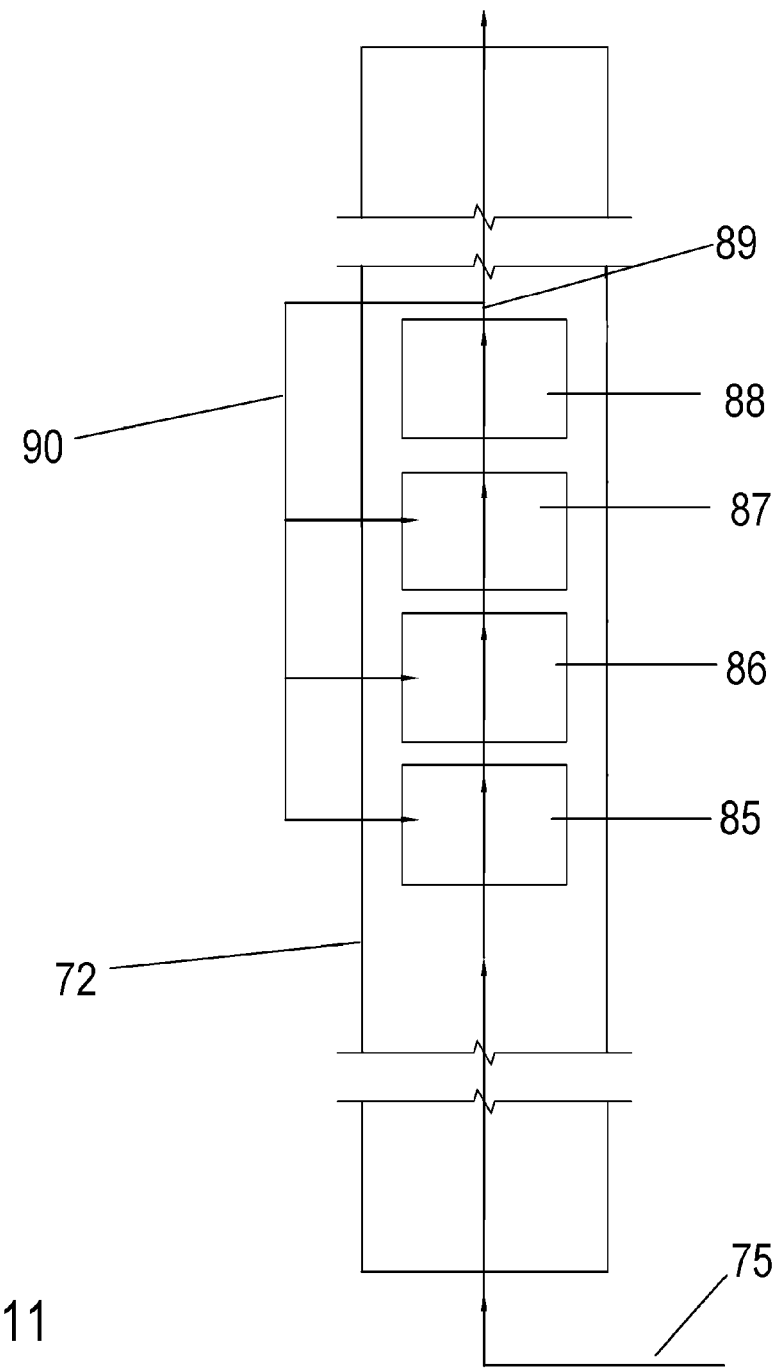
FIG. 11 is a side, cut-away view of the invention of FIG. 10, but illustrating the first alternative configuration of the regulators in serial, wherein the fourth stage comprises an adjustable regulator, the output of which is used as the reference pressure for stages 1-3.

FIG. 11 is a side, cut-away view of the probe 72 of FIG. 10, but with an alternative configuration of serial, single stage regulator stages 85-88, wherein the fourth stage (88) comprises a conventional adjustable pressure regulator stage, such as a diaphragm/load spring-type of single stage pressure regulator, the output of which is used as the reference pressure for stages one through three (85-87), and wherein said stages are situated within an insertion probe formed for insertion (via probe tip as in FIG. 10) in a pressurized pipeline containing a process gas stream as well as possible vapor phase, low volatile components.

As shown, the three single stage, pressure ratio-type regulators 85, 86, 87 (of the regulator 19 type described in the discussion of FIG. 5, supra) are provided in serial flow configuration at or near the tip of an insertion probe for sequential pressure regulation and downward adjustment, with the final stage 88 provides a conventional adjustable pressure regulator stage.

In use, fluid 75 from the gas stream flows into the probe tip and serially through first pressure ratio regulator stage 85, where the gas undergoes a first pressure drop by a predetermined ratio, then to second pressure ratio regulator stage 86 for the second pressure adjustment, then to third pressure ratio regulator stage 87 for downward pressure adjustment by the predetermined ratio, the pressure adjusted gas exiting from regulator stage (from cylinder cap passage, 9, as described in FIG. 5) to the final regulator stage 88, comprising the referenced conventional adjustable pressure regulator stage, such as a diaphragm/load spring-type of single stage pressure regulator, for the pressure adjustment to provide pressure adjusted gas having an outlet pressure which flows to an external destination outside of the pipeline.

The pressure adjusted gas 89 having the outlet pressure from adjustable pressure final regulator stage 88 flows via passage 90 to become the reference pressure of each of the adjustable pressure ratio regulator stages 85-87 (Flowing into passage 11 of each adjustable pressure ratio regulator, as shown in described in FIG. 5 and associated discussion). Alternatively, the pressure adjusted gas 89 may be configured to flow to one or more of the preceeding stages, as opposed to all preceeding stages.

As in the embodiment of FIG. 8, the present arrangement insures that the pressure of the source fluid will not be reduced below a desired minimum value, providing that said desired value is equal to or lower than said pressure of the source fluid ($PL_a$). Said arrangement may also consist of more or less pressure ratio regulator stages than shown in the present example, depending upon the operational criteria.

As shown, fluid pressure is reduced at each pressure ratio reduction stage sequentially in the manner previously described, distributing the pressure drop to several stages to minimize the likelihood of J-T coolling. Alternatives to this regulator configuration may be such that each of the said stages may independent in the sense that each one may have a different PCR or RP.

Figure 12:
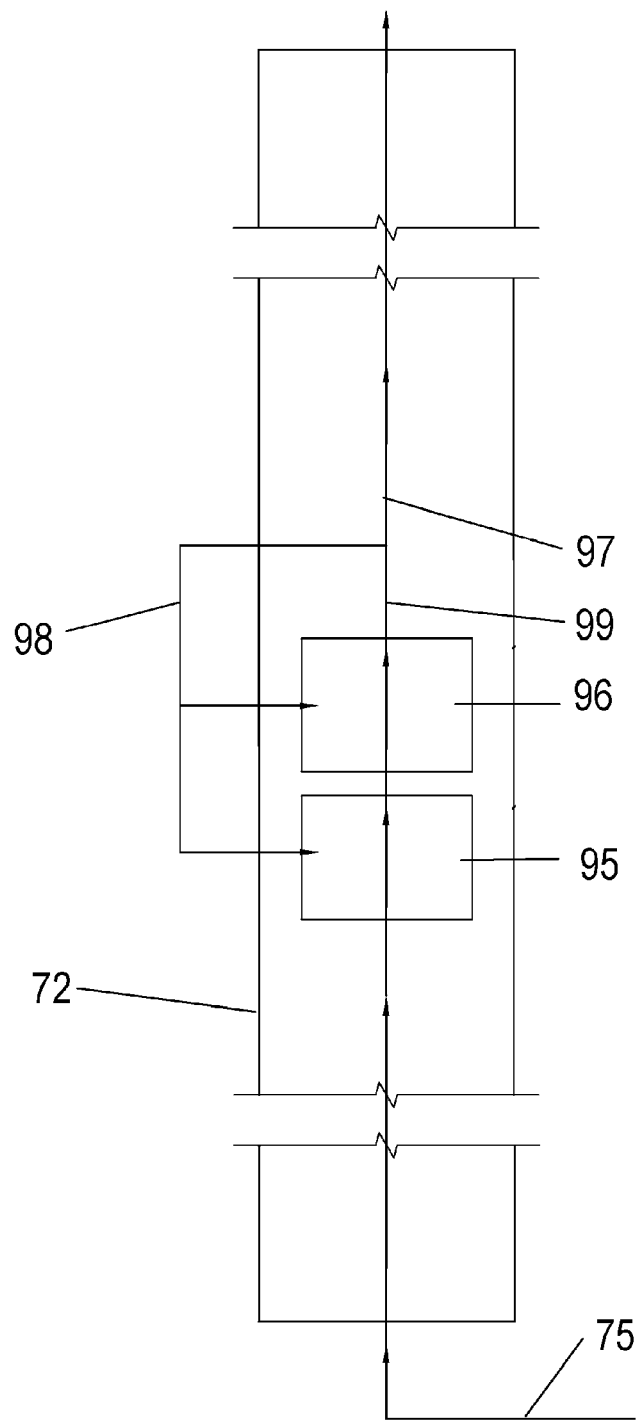
FIG. 12 is a side, cutaway view of the invention of FIG. 10, but illustrating the second alternative configuration of the regulators wherein two regulators are utilized in serial, the output of which provides a reference pressure to regulate their operation.

FIG. 12 is a side, cutaway view of the insertion probe 72 regulator invention of FIG. 11, but illustrating an alternative regulator configuration, wherein there is provided two single-stage adjustable pressure ratio regulators (regulator 19 described in the discussion of FIG. 5, supra) in serial flow configuration, the output of which provides the reference pressure for each of said regulators.

In use, fluid 75 from the gas stream flows into the probe tip and serially through first pressure ratio regulator stage 95, where the gas undergoes a first pressure drop by a predetermined ratio, then to second pressure ratio regulator stage 96 for the second pressure adjustment, providing pressure adjusted gas 99 having an outlet pressure which flows 97 to an external destination outside of the pipeline.

The pressure adjusted gas 99 of the present invention is also configured to flow via passage 98 to become the reference pressure (RP) of each of the adjustable pressure ratio regulator stages 95-96 (Flowing into passage 11 of each adjustable pressure ratio regulator, as shown in described in FIG. 5 and associated discussion).

The invention embodiments herein described are done so in detail for exemplary purposes only, and may be subject to many different variations in design, structure, application, and operational methodology. Thus, the detailed disclosures herein should be interpreted in an illustrative, exemplary manner, and not in a limiting context.

What is claimed is:

1. A method for regulating the pressure of a fluid, said fluid having a prevailing temperature, comprising the steps of:
   a. providing a first regulator having a piston having first and second ends having unequal surface areas;
   b. inserting said first regulator into said fluid;
   c. allowing said first regulator to reach the prevailing temperature of said fluid;
   d. allowing said fluid to apply fluid pressure to said first end of said piston;
   e. allowing said fluid to flow to and apply said fluid pressure to said second end of said piston, providing a force differential in the amount of force applied to said first and second piston ends due to their unequal surface areas;
   f. utilizing said force differential to facilitate movement of said piston, so as to facilitate throttling of said fluid flow when the force exerted upon one end of said piston is greater than the force exerted by the other end of said piston, providing a first regulated pressure fluid; while
   g. allowing said prevailing temperature of said fluid to maintain said regulator at isothermal condition; while
   h. providing a zone between the first and second ends of said piston which can be maintained at a reference pressure derived from a source downstream of said first regulator.

2. The method of claim 1 wherein fluid flow between said first end and second end of said piston is through a passage internal to said piston.

3. The method of claim 1, wherein said first regulator is situated in a probe having a tip, and wherein in step "b" there is further provided the step of inserting said tip of said probe into said fluid.

4. The method of claim 1, wherein there is provided the additional steps after step "h" of:
   i. providing a second regulator having a second piston having first and second ends having unequal surface areas;

j. flowing said first regulated pressure fluid in serial fashion to said first end of said second piston, so as to apply fluid pressure thereto;

k. allowing said first regulated pressure fluid from step to flow to and apply fluid pressure to said second end of said second piston, providing a force differential in the amount of force applied to said first and second ends of the second piston due to their unequal surface areas;

l. utilizing said force differential to facilitate movement of said second piston, so as to facilitate throttling of said fluid flow when the force exerted upon said one end of said second piston is greater than the force exerted by the other end of said second piston, providing second regulated pressure fluid; while;

m. providing a zone between the first and second ends of said second piston which can be maintained at said reference pressure.

5. The method of claim 4, wherein after step "m" there is provided the additional step "n" of providing an adjustable fluid pressure regulation stage, and step "l" of flowing said second regulate pressure fluid through said adjustable fluid pressure regulation stage, so as to provide adjustable pressure regulated fluid.

6. The method of claim 5 wherein said reference pressure is derived from a source of adjustable pressure downstream said second piston.

7. The method of claim 4, wherein said first and second regulators are situated in a probe having a tip, and wherein in step "j" there is further provided the step of inserting said tip of said probe into said fluid, and allowing said first and second regulators to reach the prevailing temperature of said fluid, so as to minimize the likelihood of Joules-Thomson cooling of said fluid.

8. The method of claim 6 wherein said source of adjustable pressure downstream said second piston is in series communication therewith.

9. A method for regulating the pressure of a fluid comprising the steps of:
   a. providing a first fluid pressure regulator comprising:
      i. a body having a cylinder cavity;
      ii. a piston disposed within said cylinder cavity of said body, said piston having a first end and a second end each having a surface area, said surface area of said first piston end being unequal in size to said surface area of said second piston end;
      iii. a fluid passage associated with said body for admitting fluid against said first piston end;
      iv. said piston having formed therethrough a passage for fluid to flow from said first piston end to second piston end;
   b. placing said first fluid regulator into a probe;
   c. inserting said probe into a pressurized fluid having a prevailing temperature, and allowing said probe to reach said prevailing temperature of said pressurized fluid;
   d. allowing fluid to flow, via said fluid passage, to said first end of said piston, so as to apply fluid pressure to said first end of said piston;
   e. flowing fluid through said passage formed through said piston from said first end of said piston to said second end of said piston, so as to apply fluid pressure to said second end of said piston;
   f. allowing fluid pressure applied said greater surface area of said second piston end to form an unbalance of forces resulting from the application of fluid pressure to said first and second piston ends having unequal surface areas;
   g. regulating the fluid flow via said fluid pressure applied to said first and second piston ends having unequal areas so as to reposition said piston such that throttling of the flow of said fluid is increased when the force exerted by one end of said piston is greater than the force exerted by the other end of said piston, providing regulated fluid flow, while
   h. allowing said prevailing temperature of said pressurized fluid to maintain said first fluid regulator at isothermal condition;
   i. providing a zone between the first and second ends of said piston which can be maintained at a reference pressure derived from a source downstream of said first fluid regulator, so as to affect the movement of said piston.

10. The method of claim 9 wherein in step "a" there is provided the step of providing a first fluid seal around said first piston end and a second fluid seal around said second piston end so as to form a fluid zone, a fluid passage in fluid communication with said fluid zone and an external source of fluid pressure, and in step "h" said zone is located around said piston between said first and second fluid seals, and said fluid passage in communication with said fluid zone provides said reference pressure.

11. The method of claim 10, wherein there is provided after step "i" the additional step "j" of repeating steps d-h.

12. The method of claim 10, wherein there is provided after step "i" the additional step "j" of providing a second fluid pressure regulator fluidly engaging said first fluid pressure regulator in series relationship, and a step "k" of flowing said regulated fluid flow from said first fluid pressure regulator to said second fluid pressure regulator.

13. The method of claim 10, wherein there is provided after step "i" the additional step "j" of providing an adjustable pressure regulator fluidly engaging said second fluid pressure regulator in series relationship, and a step "k" of flowing said regulated fluid flow from said second fluid pressure regulator to said adjustable pressure regulator, so as to provide regulated pressure fluid.

14. The method of claim 13, wherein, in step "j", there is further provided the step of utilizing said regulated pressure fluid as said reference pressure of step "i".

15. The method of claim 9, wherein in step "aii" said second piston end has a greater surface area than said first piston end, and wherein in step "e" said fluid pressure is applied to said first and second piston ends such that said second piston end, having greater surface area than said first piston end, received a greater application of force from said fluid pressure so as to reposition said piston throttle said fluid flow, providing said regulated fluid flow.

16. The method of obtaining a sample from a pressurized gas stream at a prevailing temperature containing entrained liquid, comprising the steps of:
   a. housing first and second pressure reducers in serial communication in an insertion probe;
   b. inserting said insertion probe into said pressurized gas stream, and allowing said first and second pressure regulators to thermodynamically engage said pressurized gas stream so that said first and second regulators reach the prevailing temperature of said gas stream;
   c. flowing a sample of said pressurized gas stream into said first pressure regulator, reducing the pressure of said sample by a first predetermined pressure control ratio, providing a first reduced gas;
   d. allowing said first and second pressure regulators to continue to thermodynamically engage said pressurized gas stream, as well as said first reduced gas to about said prevailing temperature of said gas stream, so as to minimize Joules Thomson cooling effect from the pressure from step "c" on said first reduced gas;

e. flowing said first reduced gas into said second pressure regulator, reducing the pressure of said first reduced gas by a second predetermined pressure control ratio;

f. allowing said first and second pressure regulators to continue to thermodynamically engage said pressurized gas stream, as well as said second reduced gas to about said prevailing temperature of said gas stream, so as to minimize Joules Thomson cooling effect from the pressure from step "e" on said first reduced gas;

whereby said first and second predetermined ratios of pressure reduction of said first and second pressure regulators, respectively, are selected to provide a generally uniform distribution of Joules-Thomson cooling at each stage so as to minimize the likelihood of liquid condensation resulting therefrom.

17. A method for reducing the pressure of a fluid at a predetermined ratio, comprising the steps of:

a. providing a pressure regulator comprising a piston having first and second ends having unequal surface areas to facilitate a predetermined ratio of pressure reduction pressure control;

b. allowing a fluid to apply fluid pressure to said first and second ends of said piston, providing a force differential in the amount of force applied to said first and second piston ends due to their unequal surface areas;

c. allowing said fluid to flow to and apply said fluid pressure to said second end of said piston, providing a force differential in the amount of force applied to said first and second piston ends due to their unequal surface areas;

d. utilizing said force differential to facilitate movement of said piston, so as to facilitate throttling of said fluid flow when the force exerted upon one end of said piston is greater than the force exerted by the other end of said piston;

e. providing a zone between the first and second ends of said piston which is referenced at a fluid reference pressure to influence said force differential applied to said first and second piston ends, and the resulting flow of fluid associated therewith;

f. providing a second pressure regulator fluidly engaging said first pressure regulator in series relationship;

g. flowing said pressure regulated fluid from said first pressure regulator to said second pressure regulator, utilizing said second pressure regulator to drop the pressure of said pressure regulated fluid, so as to provide second regulated pressure fluid; and h. utilizing said regulated pressure fluid as said fluid reference pressure of step "e"; and i. providing said first and second pressure regulators into an insertion probe, inserting said insertion probe into a pressurized gas stream at a prevailing temperature, and allowing said insertion probe and first and second regulators to thermodynamically engage said prevailing temperature of said pressurized gas stream.

18. The method of claim 17, wherein step "a" there is included the step of sizing said surface areas of said first and second ends of said piston to facilitate a predetermined control ratio to provided staged pressure reduction to minimize Joules Thomson cooling.

19. The method of claim 18, wherein in step "a" the ratio of the surface of one of said ends of said piston is sized relative to the other using the formula:

$$PL_b = [(PL_a - RP)PCR] + RP$$

where:

$PL_b$ = absolute pressure level at said first end of said piston;

$PL_a$ = absolute pressure level at said second end of said piston;

RP = said reference pressure; and

PCR = pressure control ratio, that is, the ratio of the surface area of said second piston end relative to said first piston end.

20. The method of claim 17 wherein, after step "e", there is further provided the step "e1" of thermally affecting said pressure regulated fluid to lessen the likelihood of Joules-Thomson cooling thereof.

21. The method of claim 17, wherein in step "g" said second pressure regulator is used to drop the pressure of said pressure regulated fluid by a predetermined ratio calculated to minimize the likelihood of condensation due to Joules Thomson cooling.

22. The method of claim 17, wherein in step "g", said second pressure regulator is of the diaphragm/load spring type.

23. The method of claim 17, wherein in step "g", said second pressure regulator is of the piston/load spring type.

* * * * *